April 27, 1948.  D. W. HIRTLE  2,440,401
DRY BATTERY FOR HEARING AIDS
Filed June 15, 1945
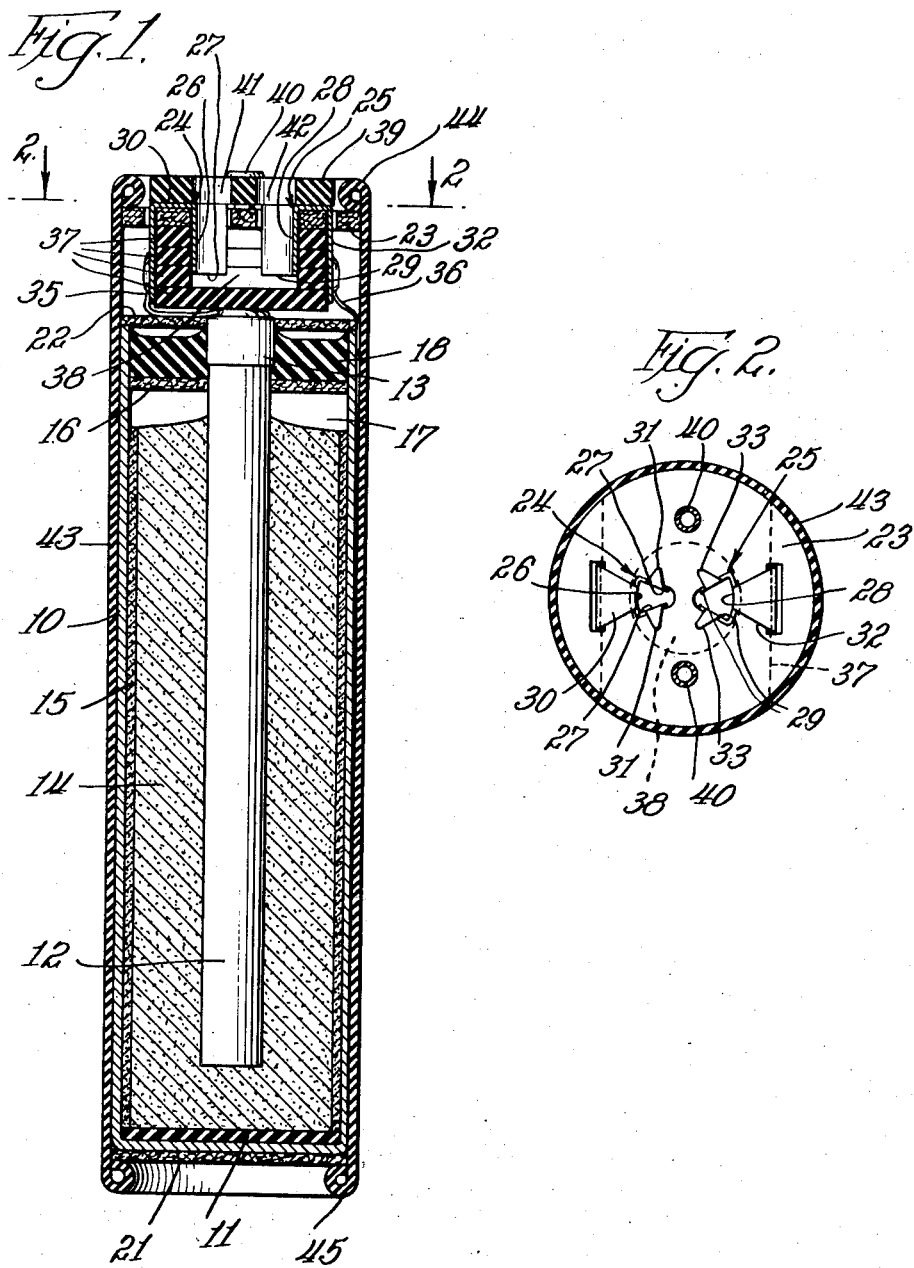
INVENTOR.
Dan W. Hirtle
BY
Jesch and Darbo Att'ys.

Patented Apr. 27, 1948

2,440,401

UNITED STATES PATENT OFFICE 2,440,401

DRY BATTERY FOR HEARING AIDS

Dan W. Hirtle, Freeport, Ill., assignor to Burgess Battery Company, Freeport, Ill., a corporation of Delaware Application June 15, 1945, Serial No. 599,726

6 Claims. (Cl. 136—107)

1

This invention relates to primary electric batteries and particularly to the relatively small dry cell batteries such as are used with hearing aids.

It is the object of the invention to provide an improved construction for batteries of the character described which is simple and economical and yet is firm and compact and also rugged and durable.

It is another object of the invention to provide a battery construction of the character described in which wax or pitch closures, other than those present in the dry cells themselves, are eliminated, and the parts are nevertheless held together firmly to form a compact unit.

In the drawing:

Fig. 1 is a longitudinal sectional view of the improved battery construction of the invention; and Fig. 2 is a transverse sectional view taken along line 2—2 of Fig. 1.

A battery of cylindrical form and employing a single dry cell is illustrated, but the invention is not limited thereto and batteries of other than the cylindrical form and employing a plurality of cells may be made in accordance with the invention. The dry cell comprises an open top hollow cylindrical zinc anode 10 upon the bottom of which is arranged a layer 11 of electrically non-conductive material which is resistant to the electrolyte of the cell, such as a heat-fusible wax or pitch or a paraffin impregnated fibrous material, such as paperboard or pulpboard. A rod-shaped carbon cathode 12 is arranged centrally within the zinc electrode 10 with its bottom end in spaced relation to the bottom of the zinc electrode 10 and the non-conductive layer 11 as shown. The carbon rod 12 has a metal cap 13 fitting in firm electrically conductive relation over its upper end. The metal cap forms a terminal for the dry cell. The carbon rod 12 is surrounded by a moist compacted body 14 of depolarizing material, which may be of the ordinary composition comprising finely divided manganese dioxide and carbon or graphite, water and electrolyte compounds such as ammonium chloride, zinc chloride, or the like. Between the depolarizing body 14 and the zinc electrode 10 is an immobile layer 15 of electrolyte, which may be composed of the usual electrolyte compounds, such as water, gelatinized starch, ammonium chloride, zinc chloride, etc. A top washer 16, which may be composed of paraffin impregnated fibrous material, such as paper or pulpboard, is arranged above the depolarizing body 14 and in spaced relation thereto to form an expansion space 17. A seal closure 18 for the cell, which may be composed of heat-fusible wax or pitch, is arranged upon washer 16 and is in adhesive contact with the metal cap 13 and the interior surface of the zinc electrode 10. The top surface of the cap 13 is exposed through the seal closure 18.

A disc 21, which may be composed of a non-conductive material, such as a synthetic resin or a fibrous material such as paper or pulp, is arranged against the exterior surface of the bottom of the zinc electrode 10. A similar disc 22 is arranged against the top end of the dry cell, the latter disc having a central opening therein through which the top surface of metal cap 13 is exposed. A third disc 23, which also may be composed of a similar non-conductive material, is arranged above the dry cell and in spaced relation thereto. The disc 23 has mounted therein the terminals 24 and 25 for the battery, which are terminals of the socket type and adapted to cooperate with the prong type of terminals of an external circuit (not shown). The terminals 24 and 25 may be composed of a suitable resilient conductive material, such as copper, brass, spring bronze, etc. The socket portion of each terminal is generally channel shaped and extends downwardly through an opening in supporting disc 23. The channel shaped portion of terminal 24 comprises a mid-section 26 and flange sections 27. At the upper end of terminal 24, the mid-section 26 of the socket portion has a portion 30 extending substantially radially outwardly and resting against the top surface of the disc 23. At a point approximately mid-way between the socket portion and the outer edge of disc 23, said portion 30 is bent downwardly and passes through an opening in disc 23 and projects toward the dry cell. The flanges 27 of the socket portion of terminal 24 have projections 31 extending outwardly from the upper ends thereof and resting against the top surface of disc 23 for support purposes. In a similar manner, terminal member 25 has a channel shaped portion consisting of mid-section 28 and flange sections 29 and also has an extension 32 and projections 33 similar to extension 30 and projections 31 of terminal member 24. Extension 30 of terminal 24 is connected to the terminal 13 of the dry cell by the conductor 35, said conductor being joined to the extension 30 and terminal 13 in a suitable manner, as by soldering. In a similar manner, extension 32 of terminal 25 is connected to the zinc electrode 10 of the dry cell by a conductor 36.

The disc 23 is supported in spaced relation above the dry cell by a number of superposed plates 37 of electrically non-conductive material, such as a synthetic resin or a fibrous material, such as pulpboard or paperboard. The upper ones of these plates are provided with openings as shown to provide a clearance space 38 for the terminals 24 and 25.

To hold the terminals 24 and 25 firmly in place, a disc 39 of fibrous or other non-conductive material is arranged above disc 23 and is fastened to the latter by means of the eyelets 40 in such manner as to hold the extensions 30 and 32 of terminals 24 and 25 firmly between the said two discs. Upper disc 39 is relatively thick and has a diameter smaller than that of disc 23 for a purpose which will be explained hereinafter. Disc 39 is provided with openings 41 and 42 through which the terminals 24 and 25 are exposed.

The entire assembly is laterally enclosed and held in firmly assembled relation by means of the open-ended tubular casing member 43, which is composed of a non-conductive material, preferably of fibrous character, such as heavy paper or pulpboard. The end portions of the tubular member 43 extend beyond the end closure discs 21 and 23 at the opposite ends of the battery construction, and are turned inwardly and backwardly as shown into engagement with said end discs, the arrangement being such that the turned portions or flanges 44 and 45 exert pressure against the end discs and thereby maintain the parts of the assembly under firm pressure contact with each other, whereby a highly compact battery unit is formed. The top disc 39 is contained within the circular space inside the flange 44 and above disc 23, and at least partially fills such space. The disc 39 provides protection for the flange 44 against injury during handling and use. If desired, a disc similar to disc 39 may be arranged within the flange 45 at the other end of the battery and attached to disc 21.

The invention provides a simple, compact, lightweight construction which is especially advantageous for batteries which are used with hearing aids. The usual heavy terminal block which contains the socket terminals is eliminated. If such terminal block is composed of a fusible material such as wax or pitch, it is subject to being broken during handling and use. In addition, the construction avoids the use of adhesive joints to fasten the parts together, which joints are normally subject to breakage and require increased labor during manufacture.

As stated heretofore, the invention is not limited to the cylindrical form of battery illustrated and described, but also embraces other forms. For example, the battery may comprise several cells, such as the cylindrical cells illustrated in Fig. 1, placed side by side to form a generally flat battery, and the parts, such as the end discs, may be elongated to conform to the lateral shape of the battery, and the exterior casing member may, likewise, be elongated laterally to conform to such shape. Also, the invention is not limited to the specific structure illustrated and described. For example, the internal construction of the cell and the construction of the terminals 24 and 25 may be different from that described. If there is no objection to having the bottom of zinc electrode 10 exposed, the bottom end disc 21 may be omitted. Also, the tubular member 43 may be composed of metal, in which case a sleeve of non-conductive material should be provided between the metal electrode 10 and the tubular member 43. Other changes may be made within the scope of the invention as the same is set forth in the appended claims.

What is claimed is:

1. A battery construction, comprising a substantially cylindrical hollow metal electrode, a second electrode within said metal electrode and having a portion thereof exposed at one end of said metal electrode, a pair of terminals at said end of said metal electrode and connected to said electrodes respectively, a substantially flat supporting member for said terminals, means for spacing said supporting member from said end of said metal electrode, a substantially flat end member at the other end of said metal electrode, and a tubular member of electrically non-conductive material laterally enclosing said metal electrode and extending beyond said end member and said supporting member at the opposite ends of said metal electrode respectively, the end portions of said tubular member being turned inwardly and backwardly to form flanges, said flanges resting in pressure engagement with the surfaces of said supporting member and said end member respectively.

2. A battery construction as claimed in claim 1, in which means are provided at at least one end of the battery construction to at least partially occupy the space encircled by said flange and protect said flange against injury.

3. A battery construction, comprising an elongated hollow metal electrode, a second electrode within said metal electrode, a pair of terminals at an end of said metal electrode and connected to said electrodes respectively, a supporting member for said terminals, means for spacing said supporting member from said end of said metal electrode, an end member at the other end of said metal electrode and a sheath of electrically non-conductive material laterally enclosing said metal electrode and extending beyond said end member and said supporting member at the opposite ends of said metal electrode respectively, the end portions of said sheath being turned inwardly and backwardly and resting in pressure engagement with said supporting member and said end member respectively.

4. A battery construction, comprising a hollow metal electrode, a second electrode within said metal electrode, a tubular sleeve of electrically non-conductive material laterally enclosing said metal electrode and extending beyond said metal electrode at the ends thereof, end closures for said tubular sleeve, the marginal portions of said end closures being substantially flat, terminals for said electrodes carried by at least one of said end closures, the portions of said tubular sleeve at both ends thereof extending beyond said end closures and being turned inwardly and backwardly and resting in pressure contact with said marginal portions of said end closures to hold the enclosed battery parts in firmly assembled relation.

5. A battery having a pair of electrodes and comprising a body member and substantially flat end members at each end of said body member, battery terminals mounted in one of said end members and connected to said electrodes respectively, and a tubular member of electrically non-conductive material fitting over said body member and extending beyond said end members, the portions of said tubular member at both ends thereof being turned inwardly and backwardly and resting in pressure contact with said end members.

6. A battery comprising a cylindrical dry cell having a pair of electrodes exposed at the top thereof, a pair of socket terminals at the top of said cell and respectively connected to said electrodes, a terminal-supporting element of non-conductive material having a periphery substantially coincident with the cylindrical surface of said cell extended, said supporting element having a flat margin at the periphery thereof, means for supporting said terminal supporting element at the top of said cell in spaced relation thereto, a bottom member at the bottom of said cell and having a flat margin at the periphery thereof, a tubular member of non-conductive material laterally enclosing said cell and extending beyond said supporting element at the top of said cell and beyond said bottom member at the bottom of said cell, the end portions of said tubular member being turned inwardly and backwardly to form flanges, said flanges resting in pressure engagement with the peripheral margins of said supporting member and said bottom member respectively, and a disc of non-conductive material mounted upon the top of said supporting member above said terminals within the space encircled by the flange of said tubular element, the top surface of said disc being substantially coplanar with the top of the surrounding flange, said disc having apertures therein for access to said terminals.

DAN W. HIRTLE.

REFERENCES CITED

The following references are of record in the file of this patent:

UNITED STATES PATENTS

| Number | Name | Date |
|---|---|---|
| 825,882 | Harper | July 10, 1906 |
| 1,176,467 | Koretzky | Mar. 21, 1916 |
| 1,299,149 | Duvall | Apr. 1, 1919 |
| 1,299,813 | Armelin | Apr. 8, 1919 |
| 2,255,516 | McEachron | Sept. 9, 1941 |
| 2,360,541 | Berigan | Oct. 17, 1944 |
| 2,396,693 | Glover | Mar. 19, 1946 |

FOREIGN PATENTS

| Number | Country | Date |
|---|---|---|
| 389,754 | Great Britain | Mar. 23, 1933 |